No. 715,259. Patented Dec. 9, 1902.
L. C. GLISSON.
FAUCET.
(Application filed Apr. 21, 1902.)
(No Model.)
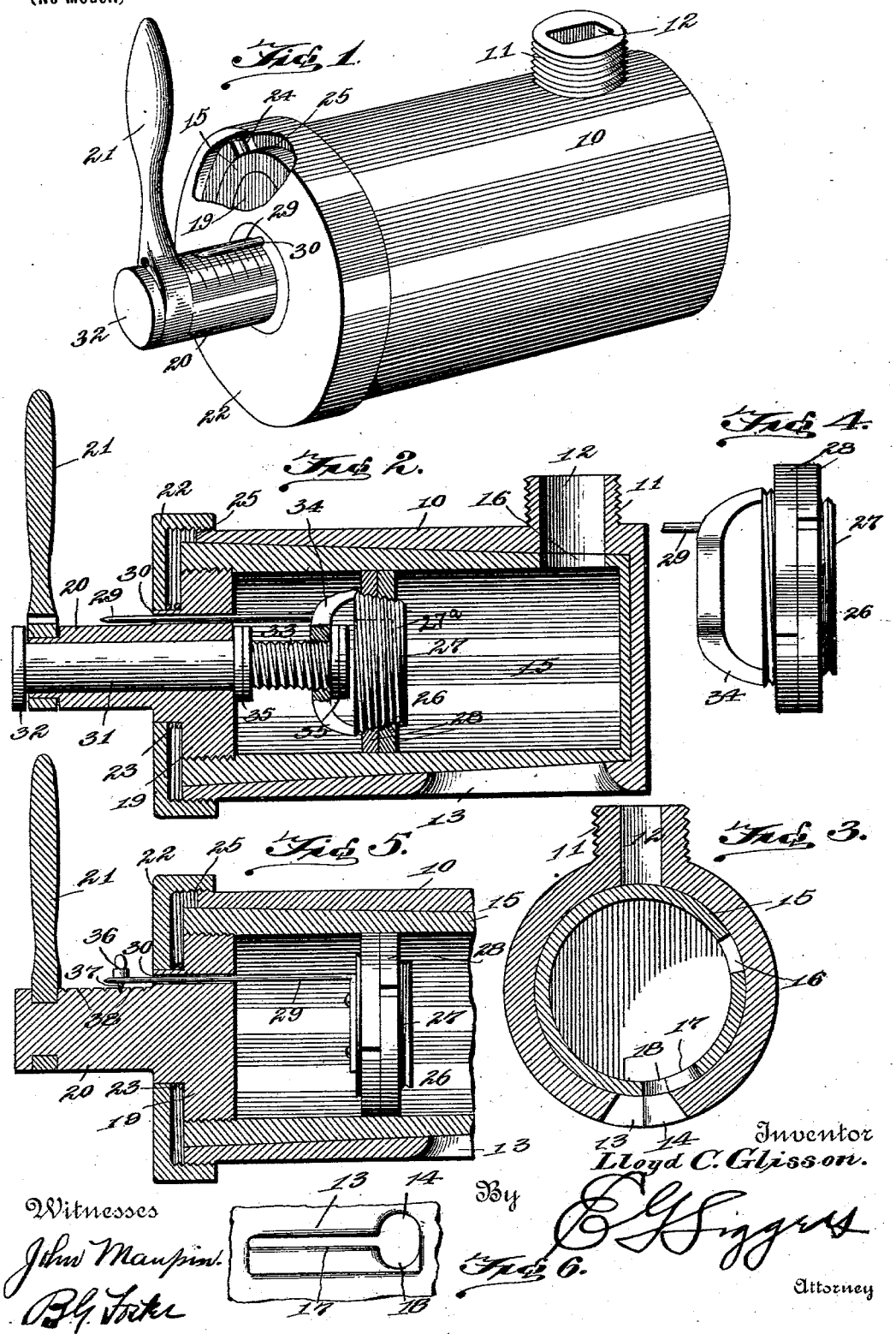
Witnesses
John Maupin
B. G. Fiske
Inventor
Lloyd C. Glisson.
By
C. G. Siggers
Attorney

UNITED STATES PATENT OFFICE.

LLOYD C. GLISSON, OF STATESBORO, GEORGIA.

FAUCET.

SPECIFICATION forming part of Letters Patent No. 715,259, dated December 9, 1902.

Application filed April 21, 1902. Serial No. 103,971. (No model.)

*To all whom it may concern:*

Be it known that I, LLOYD C. GLISSON, a citizen of the United States, residing at Statesboro, in the county of Bulloch and State of Georgia, have invented a new and useful Faucet, of which the following is a specification.

The present invention relates to measuring-faucets, and while it is primarily intended for use in connection with syrup-tanks of soda-water-dispensing apparatus it will be readily apparent that the invention is capable of more extensive use, as it may be employed in drawing liquids and materials of various kinds.

One object of the invention is to provide a simple faucet by means of which any desired amount of material may be accurately measured and drawn from a reservoir or receptacle, said faucet having indicating means which will show the amount so measured.

Another object is to provide simple means for regulating as desired the amount to be drawn, said means being comparatively inexpensive in construction and having operating mechanism arranged in convenient relation to the operator of the faucet.

The preferred construction of the faucet is illustrated in the accompanying drawings, wherein—

Figure 1 is a perspective view of the faucet. Fig. 2 is a longitudinal sectional view. Fig. 3 is a cross-section. Fig. 4 is a detail view, in side elevation, of the plunger employed. Fig. 5 is a longitudinal sectional view through a slightly-modified form of construction. Fig. 6 is a bottom plan detail view of a portion of the faucet, more clearly showing the construction of the discharge-openings of the casing and receptacle.

Similar numerals of reference designate corresponding parts in all the figures of the drawings.

In the present construction of the invention, a casing 10 is employed, preferably cylindrical in form and having one end open. This casing is provided contiguous to its rear end with an upstanding nipple 11, through which is arranged an inlet-opening 12, an outlet-opening 13 being arranged in the lower portion of the receptacle. This opening is in the form of a longitudinally-disposed slot having an enlarged portion 14 in one side thereof.

Within the casing 10 is rotatably mounted a measuring-receptacle 15 in the form of a hollow tapered plug that fits snugly within said casing, the bore of which is tapered to conform to the same. This receptacle is provided in one wall with an inlet-opening 16, that is movable into and out of alinement with the opening 12 of the casing, and it is furthermore provided with an outlet 17, that is movable into and out of alinement with the outlet 13 of the casing, said outlet 17 being also in the form of a slot having an enlarged portion 18, that coacts with the enlarged portion 14 of the discharge-opening 13, said enlarged portion 18 being arranged in the opposite edge of the discharge from the enlarged portion 14, all of which is clearly shown in Fig. 6. The outer end of the receptacle 15 is closed by a head 19, threaded into the same, said head carrying an outstanding stem 20, to which is attached a suitable operating-handle 21. A cap 22 is threaded upon the open end of the casing and covers the end of the receptacle 15, said cap having an opening through which the stem 20 passes, a spring-washer 23 being interposed between the cap and head 19 to maintain a tight fit between the receptacle 15 and the casing 10. The rotary movement of the receptacle 15 is limited by means of a pin 24, secured to its outer end and working in a slot 25, formed in the end of the casing, the ends of said slot constituting shoulders, against which the pin abuts. This arrangement will be readily understood by reference to Fig. 1, wherein a portion of the cap is broken away to illustrate the same. A plunger 26 is slidably mounted within the receptacle and movable longitudinally therein, said plunger preferably comprising a tapering threaded plug 27, upon which are screwed a plurality of split washers 28, of suitable packing material, said washers having their terminals arranged out of alinement to prevent leakage. A pointer 29 is attached to the plunger and projects through an opening 30, made for the purpose in the head 19, said pointer being movable along the stem 20, which stem is provided with suitable indicating-graduations. Mechanism is also employed for moving the plunger longitudinally within the casing, two forms of this mechanism being illustrated. In one a shank 31 is rotatably mounted in the stem 20 and has on its outer end a thumb-disk 32, its inner end being threaded, as shown at 33. The plug 27 carries a yoke 34, having a threaded opening therein, which receives the threaded portion of the shank 31, and stop-nuts 35 are secured to said shank on opposite sides of the yoke to limit the movement of the plunger and to hold the shank in proper position in the stem. The plug is furthermore provided with a suitable socket or recess 27ª, (indicated in dotted lines in Fig. 2,) which socket or recess is arranged to receive the inner end of the shank and permit the necessary movement of the plunger. Instead of this arrangement the pointer 29 may also constitute the actuating means for the plunger, as is clearly shown in Fig. 5. In this case the outer end of said pointer is preferably provided with a handle-piece 36 and a tooth 37, arranged to engage in a plurality of notches 38, made in the stem 20, said notches forming a part of the indicating-scale, as will be readily understood.

The manner of operating this device will be readily apparent. A fluid-reservoir is of course attached to the nipple 11, so that when the receptacle 15 is rotated to bring its inlet 16 into alinement with the inlet 12 of the casing the compartment in rear of the plunger 26 will be filled, the outlets of the receptacle and casing being, of course, out of alinement. Upon rotating the receptacle a suitable distance to the right the inlet 16 will be moved out of alinement with the inlet 12, while the outlets 13 and 17 will be alined, so that the fluid will be discharged. In case it is desired to permit only a small amount to pass out these outlets are so arranged that the enlarged portions may only be in alinement, thereby providing a comparatively small orifice; but in order to quickly discharge the entire contents of the receptacle the slots 13 and 17 are alined. The beveled shape of the outlet in the casing prevents any dripping when the outlets are closed. In case it is desired to enlarge or contract the compartment in rear of the plunger 26 said plunger is moved in one direction or the other, the amount of liquid contained therein being shown by the position of the pointer 29 with relation to the scale upon the stem.

By this construction it will be seen that an exceedingly simple arrangement is provided by means of which various amounts may be measured and drawn from a reservoir, said amount being indicated at a point where it can be observed by the operator. The construction of the plunger prevents any leakage about it, and when it becomes worn the packing-washers may be expanded by screwing the plug more tightly therein. As already described, the liquid may be discharged in a small stream or almost instantly from the receptacle 15, and there is no leakage or dripping from said discharge.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a measuring-faucet, the combination with a casing, of a measuring-receptacle rotatably mounted within the casing, a plunger longitudinally movable within the receptacle, said plunger being provided in its rear face with a socket and having a yoke located over the socket, and an actuating-stem having a threaded engagement with the yoke and movable into and out of the socket.

2. In a measuring-faucet, the combination with a casing, of a measuring-receptacle movably mounted within the casing, a handle located exteriorly of the casing and connected to the receptacle, a plunger slidably mounted within the receptacle, and an indicating device connected to the plunger and projecting from the casing contiguous to the handle, said indicator being movable with the plunger.

3. In a measuring-faucet, the combination with the receptacle, and an operating-stem connected to the receptacle and having a scale thereon, of a plunger slidably mounted within the receptacle, and an indicating device connected to the plunger and projecting from the same to the stem, said indicator coacting with the scale thereof.

4. In a measuring-faucet, the combination with the receptacle having an operating-stem projecting therefrom, said stem being provided with an indicator-scale, a plunger slidably mounted within the casing and longitudinally movable therein, and an indicating-pointer carried by the plunger and coacting with the scale of the stem.

5. In a measuring-faucet, the combination with a casing, of a measuring-receptacle movably mounted in the casing and provided with a scale, a plunger movably mounted within the receptacle, and a pointer carried by the plunger and projecting from the receptacle, said pointer coacting with the scale and being movable with the plunger.

6. In a measuring-faucet, the combination with the receptacle having an actuating-stem provided with a handle, of a plunger slidably mounted within the receptacle, and a shank rotatably mounted in the stem and having a threaded engagement with the plunger.

7. In a measuring-faucet, the combination with the receptacle having a stem, a plunger slidably mounted within the receptacle and having a yoke provided with a threaded opening, and a shank rotatably mounted in the stem of the receptacle and having a threaded engagement with the yoke of the plunger.

8. In a measuring-faucet, the combination with a receptacle provided with a stem having a scale marked thereon, a plunger slidably mounted within the receptacle, means passing through the stem and engaging the plunger to move the same, and a pointer carried by the plunger and coacting with the scale on the stem.

9. In a measuring-faucet, the combination with the receptacle, of a plunger movably mounted within the receptacle, said plunger comprising a tapering threaded plug, and packing-washers screwed upon the plug.

10. In a faucet, the combination with a casing having an outlet-opening comprising a narrow long slot terminating at one end in an enlarged portion, of a receptacle rotatably mounted within the casing and having an outlet-opening consisting of a similar narrow slot having an enlarged portion at one end, the outlet-opening of the receptacle being adapted to register with the outlet-opening of the casing either wholly or partly, substantially as described.

11. In a measuring-faucet, the combination with the receptacle, of a plunger movably mounted within the receptacle, said plunger comprising a tapering threaded plug, and packing-washers screwed upon the plug, said washers being split with their split portions arranged out of alinement.

In testimony that I claim the foregoing as my own I have hereto affixed my signature in the presence of two witnesses.

LLOYD C. GLISSON.

Witnesses:
J. J. E. ANDERSON,
S. L. MOORE.